US009172255B2

(12) United States Patent
Tsai

(10) Patent No.: US 9,172,255 B2
(45) Date of Patent: Oct. 27, 2015

(54) METHOD AND APPARATUS FOR PERFORMING BATTERY BALANCING CONTROL WITH AID OF PLUGGABLE MECHANISM

(71) Applicant: Fu-Sheng Tsai, Taoyuan County (TW)

(72) Inventor: Fu-Sheng Tsai, Taoyuan County (TW)

(73) Assignee: Fu-Sheng Tsai, Taoyuan Dist., Taoyuan (TW)

( * ) Notice: Subject to any disclaimer, the term of this patent is extended or adjusted under 35 U.S.C. 154(b) by 183 days.

(21) Appl. No.: 13/940,192

(22) Filed: Jul. 11, 2013

(65) Prior Publication Data

US 2014/0015490 A1 Jan. 16, 2014

Related U.S. Application Data

(60) Provisional application No. 61/671,099, filed on Jul. 13, 2012.

(51) Int. Cl.
*H02J 7/00* (2006.01)
*G06F 17/50* (2006.01)

(52) U.S. Cl.
CPC .......... *H02J 7/0014* (2013.01); *G06F 17/5009* (2013.01); *H02J 7/0016* (2013.01); *H02J 7/0042* (2013.01); *G06F 2217/78* (2013.01)

(58) Field of Classification Search
CPC .......... H02J 9/02; H02J 9/065; H02J 7/0016; H02J 1/14; H02J 3/28; H02J 4/00; H02J 7/0014; H02J 9/061; H02J 3/005; H02J 7/0019; H02J 7/0018; H02J 7/0042; Y02B 20/42; Y10T 307/344; Y10T 307/352
USPC .......... 320/130–136
See application file for complete search history.

(56) References Cited

U.S. PATENT DOCUMENTS

| | | | | |
|---|---|---|---|---|
| 2010/0085009 | A1 * | 4/2010 | Kang et al. | 320/118 |
| 2011/0109269 | A1 * | 5/2011 | Li | 320/116 |
| 2012/0274283 | A1 * | 11/2012 | van Lammeren | 320/118 |

* cited by examiner

*Primary Examiner* — Binh Tat
(74) *Attorney, Agent, or Firm* — Winston Hsu; Scott Margo

(57) ABSTRACT

A method for performing battery balancing control with aid of pluggable mechanism is provided. The method is applied to a power supply device. The method includes the steps of: providing a pluggable external module, wherein the pluggable external module includes a first connection port, and further includes a set of external balancing circuits corresponding to a set of battery cells of a specific battery module within the power supply device, respectively; and on a case of the specific battery module, providing a second connection port corresponding to the first connection port, allowing the pluggable external module to be coupled to the specific battery module with aid of the pluggable mechanism formed with the first connection port and the second connection port, in order to utilize the set of external balancing circuits to perform balancing operations on the set of battery cells. Associated apparatuses are further provided.

18 Claims, 16 Drawing Sheets

200

Start

210

Provide a pluggable external module, wherein the pluggable external module includes a set of external balancing circuits and a first connection port, and the set of external balancing circuits corresponds to a set of battery cells of a specific battery module within the power supply device, respectively

220

Provide a second connection port corresponding to the first connection port on a case of the specific battery module, allowing the pluggable external module to be coupled to the specific battery module with aid of the pluggable mechanism formed with the first connection port and the second connection port, in order to utilize the set of external balancing circuits to perform balancing operations upon the set of battery cells End

METHOD AND APPARATUS FOR PERFORMING BATTERY BALANCING CONTROL WITH AID OF PLUGGABLE MECHANISM

CROSS REFERENCE TO RELATED APPLICATIONS

This application claims the benefit of U.S. provisional application No. 61/671,099, filed on Jul. 13, 2012, the contents of which are incorporated herein by reference.

BACKGROUND OF THE INVENTION

1. Field of the Invention

The disclosed embodiments of the present invention relate to a power supply device, and more particularly, to a method for performing battery balancing control with aid of pluggable mechanism and a related apparatus.

2. Description of the Prior Art

A conventional power supply device (e.g. a redundant power supply) usually includes a special purpose control circuit disposed therein in order to control operations of batteries within the conventional power supply device. In accordance with the related art, as the control circuit within the conventional power supply device requires a special design, certain problems may occur. For example, when output specifications of the conventional power supply device vary, the control circuit needs to be modified accordingly, resulting in an increase of related costs. In another example, as the design of the control circuit is updated in response to user requirements, mechanical elements within the conventional power supply device (e.g. cases) need to be modified accordingly, resulting in an increase of related costs. Thus, a novel method is needed to enhance the control of the power supply device without introducing undesirable side effects and improve the basic architecture of the power supply device.

SUMMARY OF THE INVENTION

It is therefore one objective of the present invention to provide a method for performing battery balancing control with aid of pluggable mechanism and a related apparatus to solve the above problems.

It is therefore another objective of the present invention to provide a method for performing battery balancing control with aid of pluggable mechanism and a related apparatus to realize automatic balancing between a set of battery cells in a battery module economically without introducing undesirable side effects.

According to a preferred embodiment of the present invention, an exemplary method for performing battery balancing control with aid of pluggable mechanism is disclosed. The method is applied to a power supply device. The method comprises the following steps: providing a pluggable external module, wherein the pluggable external module comprises a set of external balancing circuits and a first connection port, and the set of external balancing circuits corresponds to a set of battery cells of a specific battery module within the power supply device, respectively; and providing a second connection port corresponding to the first connection port on a case of the specific battery module, allowing the pluggable external module to be coupled to the specific battery module with aid of the pluggable mechanism formed with the first connection port and the second connection port, in order to utilize the set of external balancing circuits to perform balancing operations upon the set of battery cells.

Besides the above method, an associated apparatus for performing battery balancing control with aid of pluggable mechanism is also provided correspondingly. The apparatus comprises at least one portion of a power supply device. The apparatus comprises a pluggable external module, wherein the pluggable external module comprises a set of external balancing circuits and a first connection port. Specifically, the set of external balancing circuits is arranged for performing the balance operations, wherein the set of external balancing circuits corresponds to a set of battery cells of a specific battery module within the power supply device, respectively. The first connection port comprises a plurality of connection ports, and the connection ports are coupled to the set of external balancing circuits, respectively. Additionally, a second connection port corresponding to the first connection port is disposed on a case of the specific battery module, allowing the pluggable external module to be coupled to the specific battery module with aid of the pluggable mechanism formed with the first connection port and the second connection port, in order to utilize the set of external balancing circuits to perform balancing operations upon the set of battery cells.

Besides the above method, an associated apparatus for performing battery balancing control with aid of pluggable mechanism is also provided correspondingly. The apparatus comprises at least one portion of a power supply device. The apparatus comprises a power supply module, wherein the power supply module comprises a specific battery module and a case. Specifically, the power supply module corresponds to a pluggable external module of the power supply device, and the pluggable external module comprises a set of external balancing circuits and a first connection port. The specific battery module comprises a set of battery cells, wherein the set of external balancing circuits corresponds to the set of battery cells, respectively. A second connection port corresponding to the first connection port is disposed on the case, allowing the pluggable external module to be coupled to the specific battery module with aid of the pluggable mechanism formed with the first connection port and the second connection port, in order to utilize the set of external balancing circuits to perform balancing operations upon the set of battery cells, wherein the second connection port comprises a plurality of connection ports, and the connection ports are coupled to the set of external balancing circuits, respectively.

It is an advantage of the present invention that the method and apparatus for performing battery balancing control with aid of pluggable mechanism may realize automatic balancing between a set of battery cells in a battery module economically without introducing undesirable side effects. The proposed method and apparatus may realize self-balancing of a power supply device having multiple battery cells. Additionally, the proposed method and apparatus may realize a power supply device with a modifiable architecture, wherein the number of battery modules of the power supply device may be adjusted according to requirements. By use of the pluggable external module, a circuit system of any battery module within the power supply device may be modified or upgraded if necessary. Thus, the proposed method and apparatus are beneficial for manufacturing, testing, installation, usage, servicing (e.g. replacing failed battery module(s)) and/or flexibility promotion (in one example, changing output specifications by adding or removing at least one battery module; in another example, modifying a circuit system of any battery module by adding or removing at least one pluggable external module) of the power supply device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
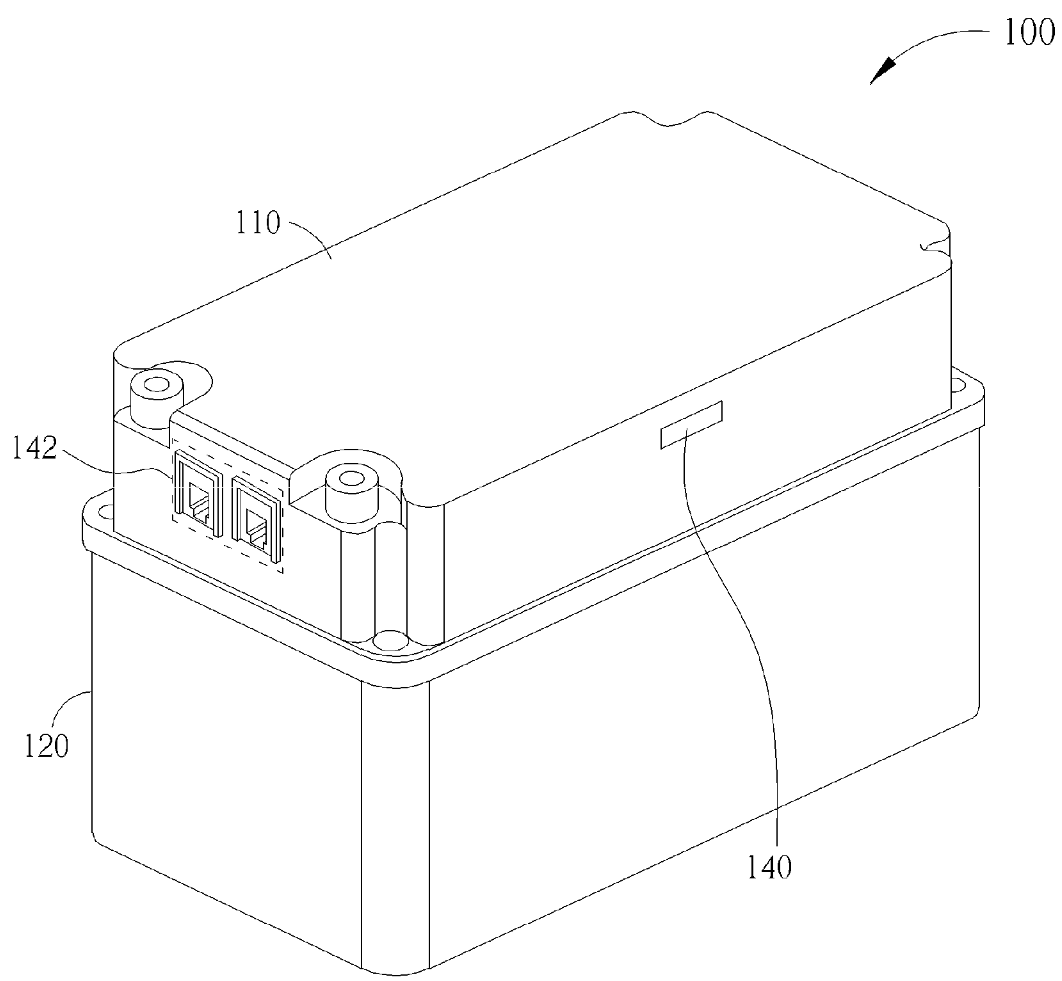
FIG. 1 is a diagram illustrating an exemplary apparatus for performing battery balancing control with aid of pluggable mechanism according to a first embodiment of the present invention.

FIG. 1 is a diagram illustrating an exemplary apparatus 100 for performing battery balancing control with aid of pluggable mechanism according to a first embodiment of the present invention. The apparatus 100 may include at least one portion (e.g. a portion or all) of a power supply device, wherein the power supply device may be, for example but not limited to, a redundant power supply. In one example, the apparatus 100 may include the whole of the power supply device. In another example, the apparatus 100 may include at least one of modules within the power supply device (e.g. at least one of power supply modules). This is for illustrative purposes only, and is not meant to be a limitation of the present invention. According to variations of the embodiment, such as variations of the first embodiment, the apparatus 100 may include an electrical system within the power supply device, and the electrical system may include at least one control circuit of the power supply device. According to variations of the embodiment, such as other variations of the first embodiment, the apparatus 100 may represent all parts of the electrical system excluding batteries (e.g. the aforementioned at least one control circuit). According to variations of the embodiment, such as other variations of the first embodiment, the apparatus 100 may represent a system including the power supply device, wherein the power supply device is a sub-system of the system.

As shown in FIG. 1, the apparatus 100 may include at least one case (e.g. a top case 110 and a bottom case 120), at least one connection port (e.g. a connection port 140 and at least one other connection port 142) and elements disposed in the at least one case (not shown in FIG. 1). The at least one case and the elements disposed therein may form a power supply module, which may be an example of any one of the aforementioned power supply modules. Please note that both the connection port 140 and the connection port 142 in this embodiment are disposed on the at least one case such as the top case 110. This is for illustrative purposes only, and is not meant to be a limitation of the present invention. According to variations of the present invention, such as variations of the first embodiment, at least one portion (e.g. a portion or all) of the connection port 140 and the connection port 142 may be disposed on the at least one case such as the bottom case 120. In the embodiment shown in FIG. 1, the connection port 140 and the connection port 142 may an example of the aforementioned at least one connection port. This is for illustrative purposes only, and is not meant to be a limitation of the present invention. According to variations of the present invention, such as variations of the first embodiment, the connection port 140 may an example of the at least one connection port, wherein the at least one connection port does not include the connection port 142 in the variations.

In practice, each of the power supply modules may be implemented as a battery pack (e.g. the architecture shown in FIG. 1). Hence, each of the power supply modules may be regarded as a module having independent architecture.

Figure 2:
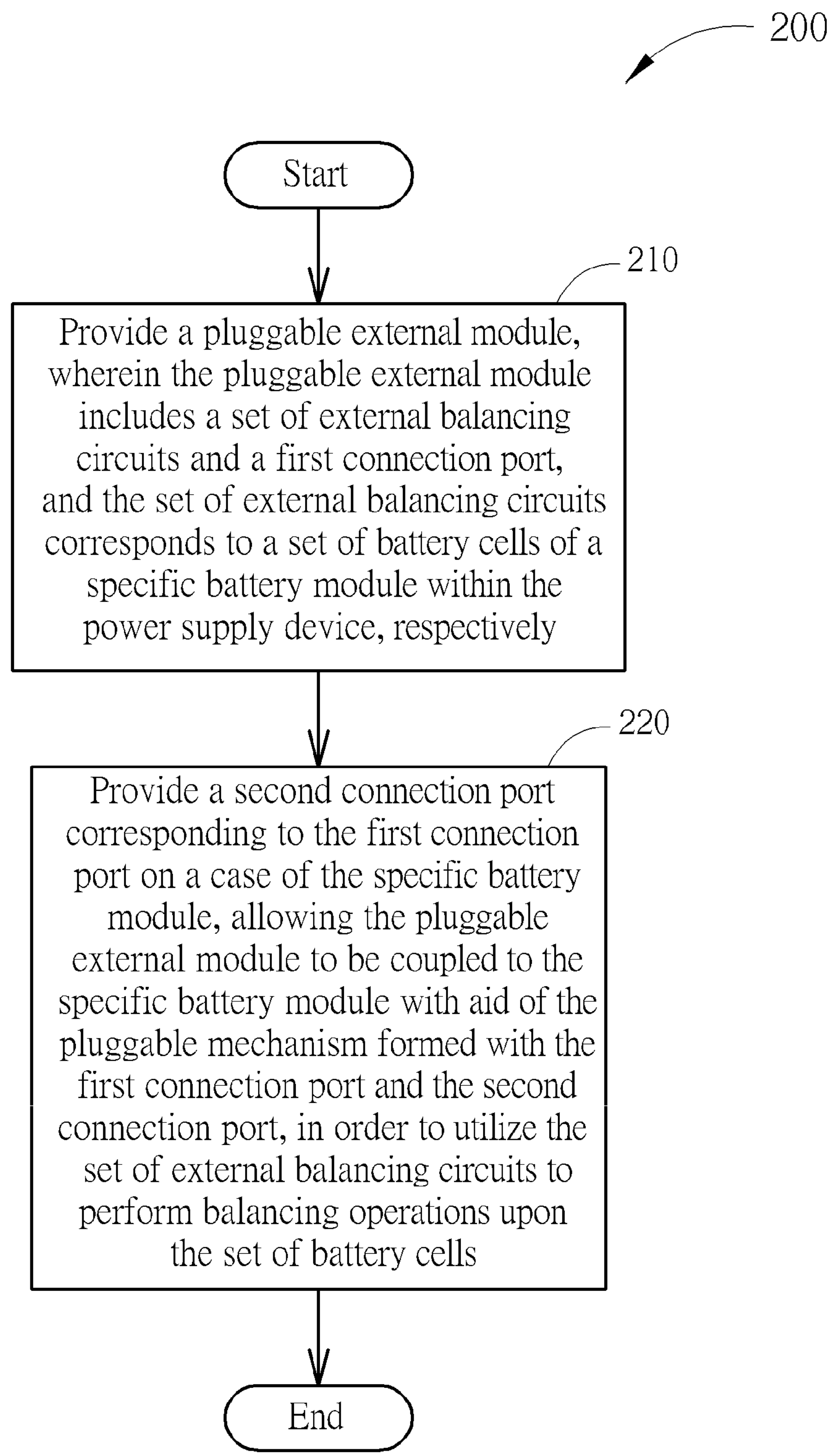
FIG. 2 is a flowchart illustrating an exemplary method for performing battery balancing control with aid of pluggable mechanism according to an embodiment of the present invention.

FIG. 2 is a flowchart illustrating an exemplary method 200 for performing battery balancing control with aid of pluggable mechanism according to an embodiment of the present invention. The method 200 may be applied to the apparatus 100 shown in FIG. 1. The method 200 is described below.

In step 210, a pluggable external module (not shown in FIG. 1) is provided, wherein the pluggable external module includes a set of external balancing circuits and a first connection port, and the set of external balancing circuits corresponds to a set of battery cells of a specific battery module within the power supply device (e.g. the battery module within the power supply module represented by the architecture shown in FIG. 1), respectively. Further description of the pluggable external module is provided later.

In step 220, a second connection port (e.g. the connection port 140) corresponding to the first connection port is provided on a case of the specific battery module (e.g. the at least one case, such as the top case 110, of the power supply module represented by the architecture shown in FIG. 1), allowing the pluggable external module to be coupled to the specific battery module with aid of the pluggable mechanism formed with the first connection port and the second connection port, in order to utilize the set of external balancing circuits to perform balancing operations upon the set of battery cells.

Figure 3:
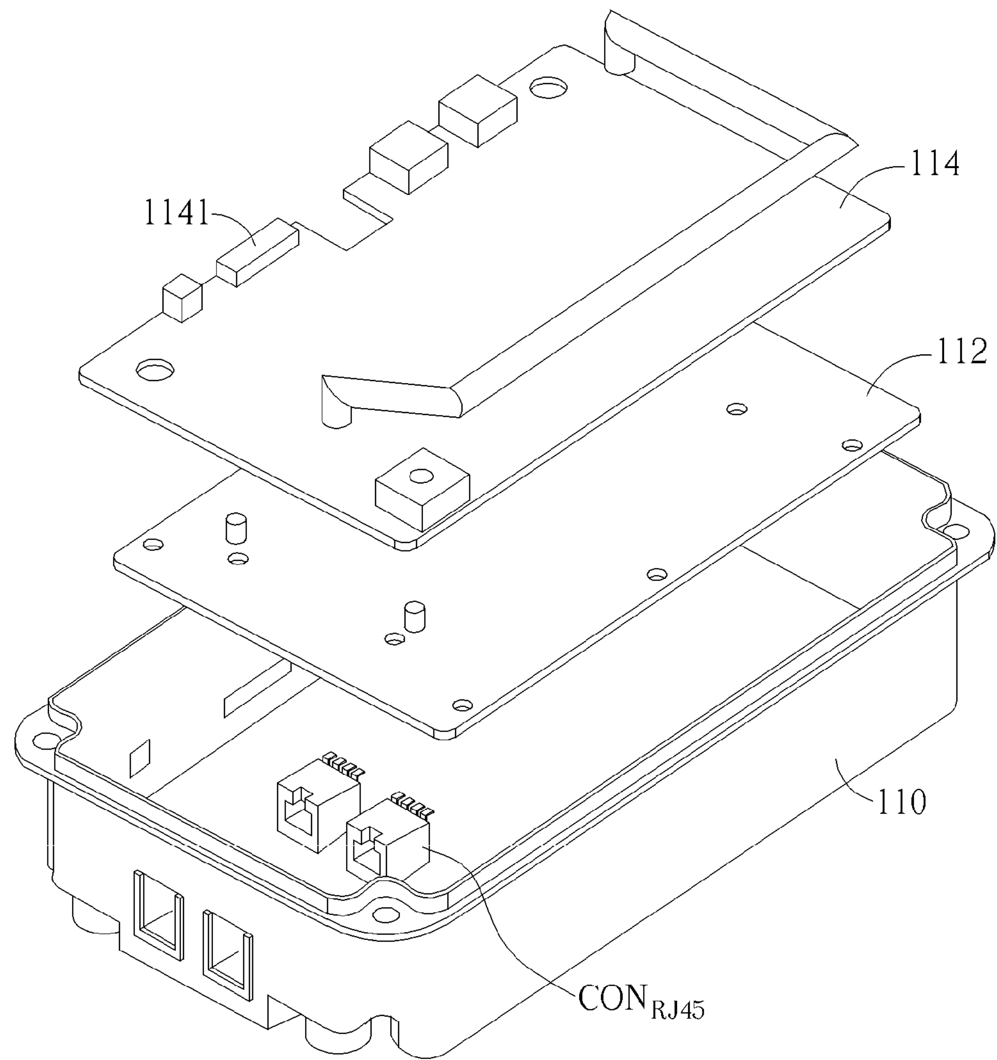
FIG. 3 is a diagram illustrating a top case, an internal heat sink, a printed circuit board and a connector involved with the method shown in FIG. 2 according to an embodiment of the present invention.
Figure 4:
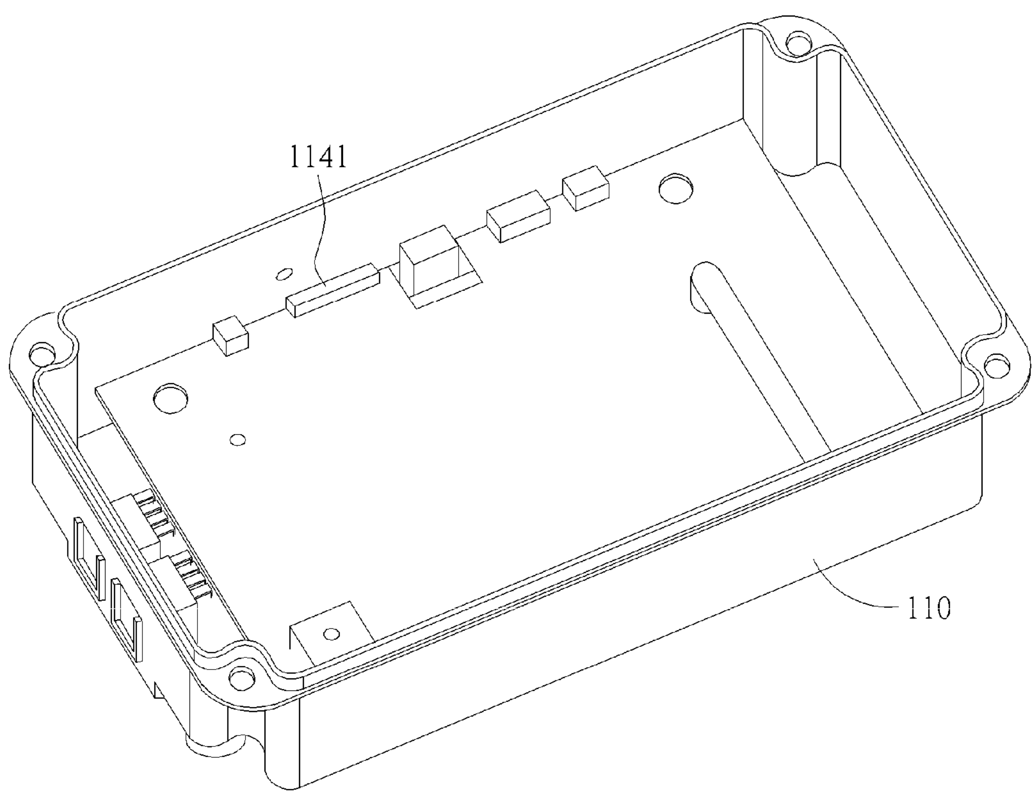
FIG. 4 is a diagram illustrating assembly of the elements shown in FIG. 3.
Figure 5:
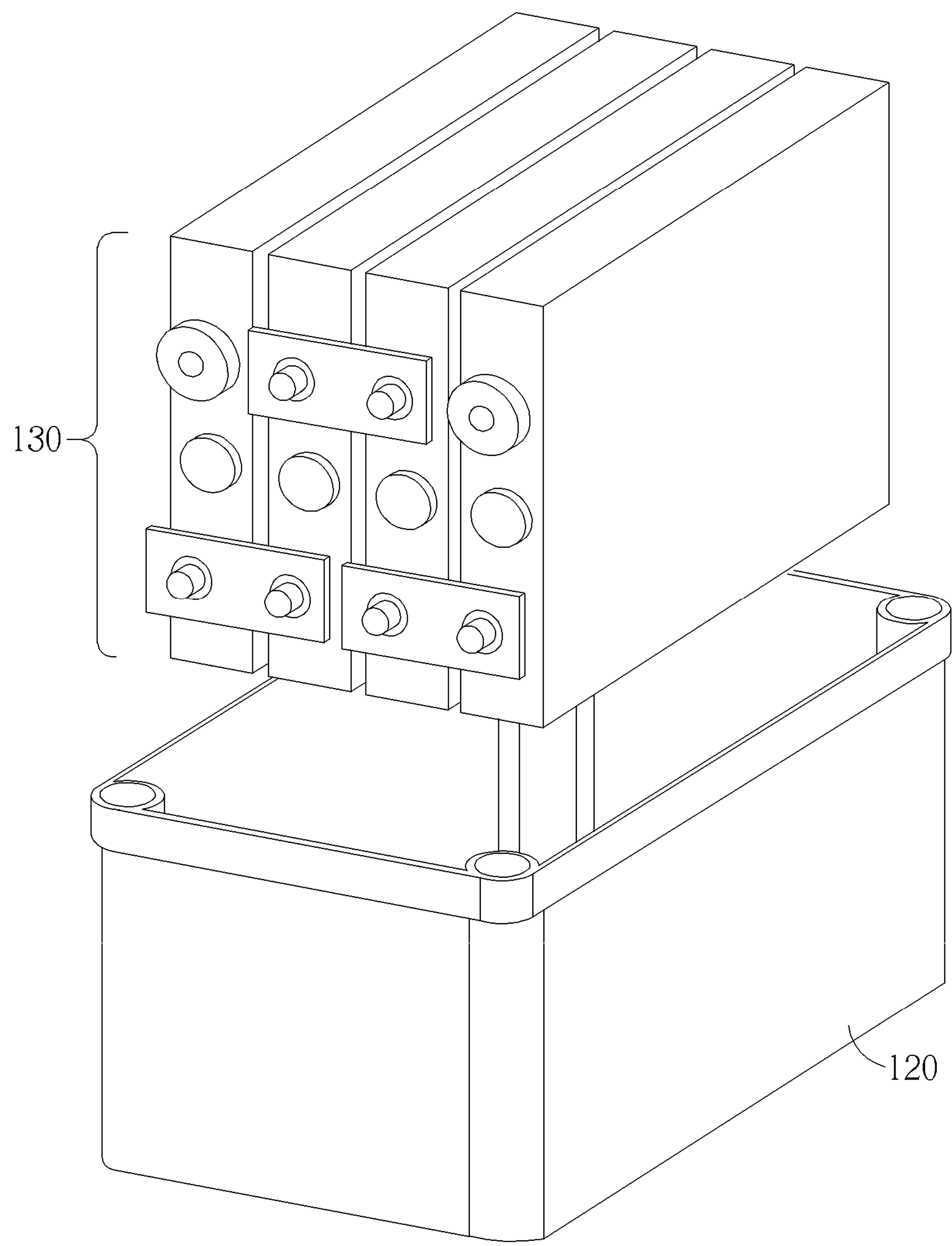
FIG. 5 is a diagram illustrating a bottom case and a battery module involved with the method shown in FIG. 2 according to the embodiment shown in FIG. 3.
Figure 6:
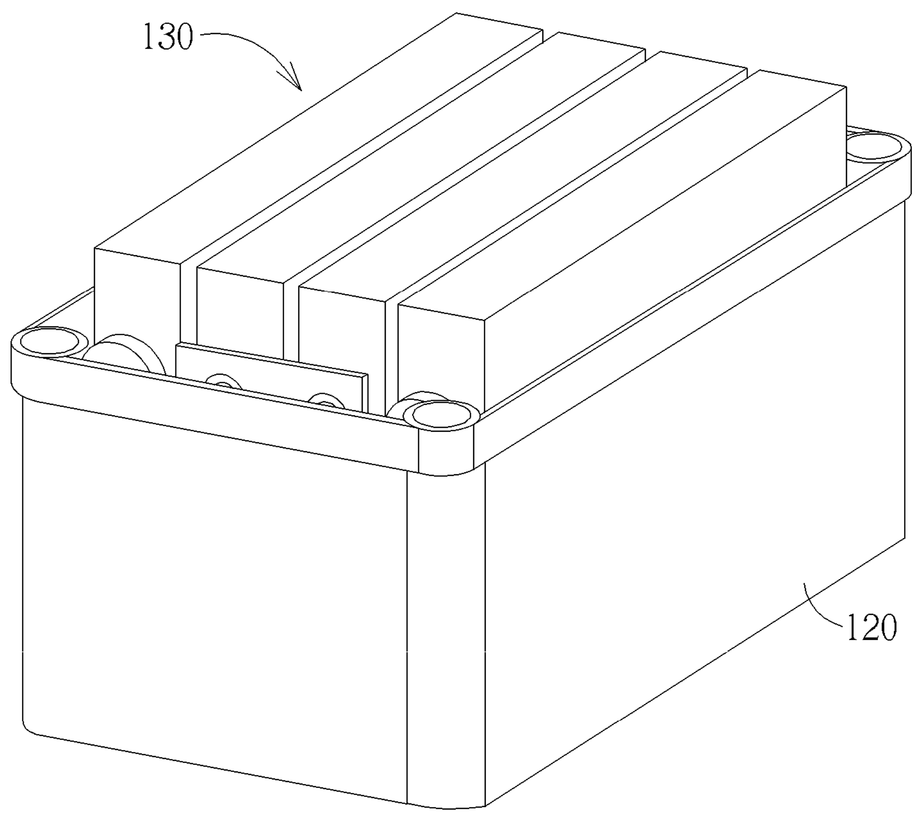
FIG. 6 is a diagram illustrating assembly of the elements shown in FIG. 5.
Figure 7:
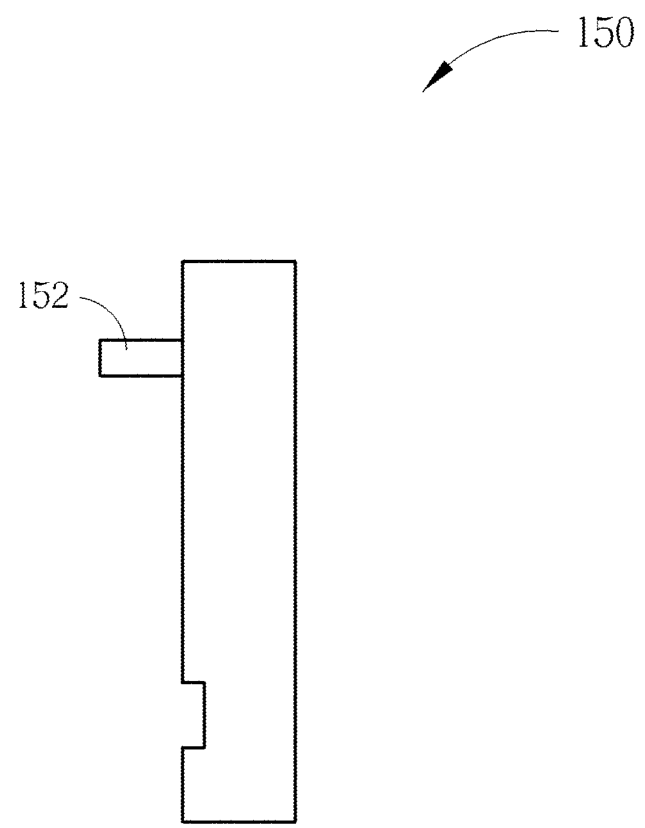
FIG. 7 is a diagram illustrating a pluggable external module involved with the method shown in FIG. 2 according to the embodiment shown in FIG. 3.
Figure 8:
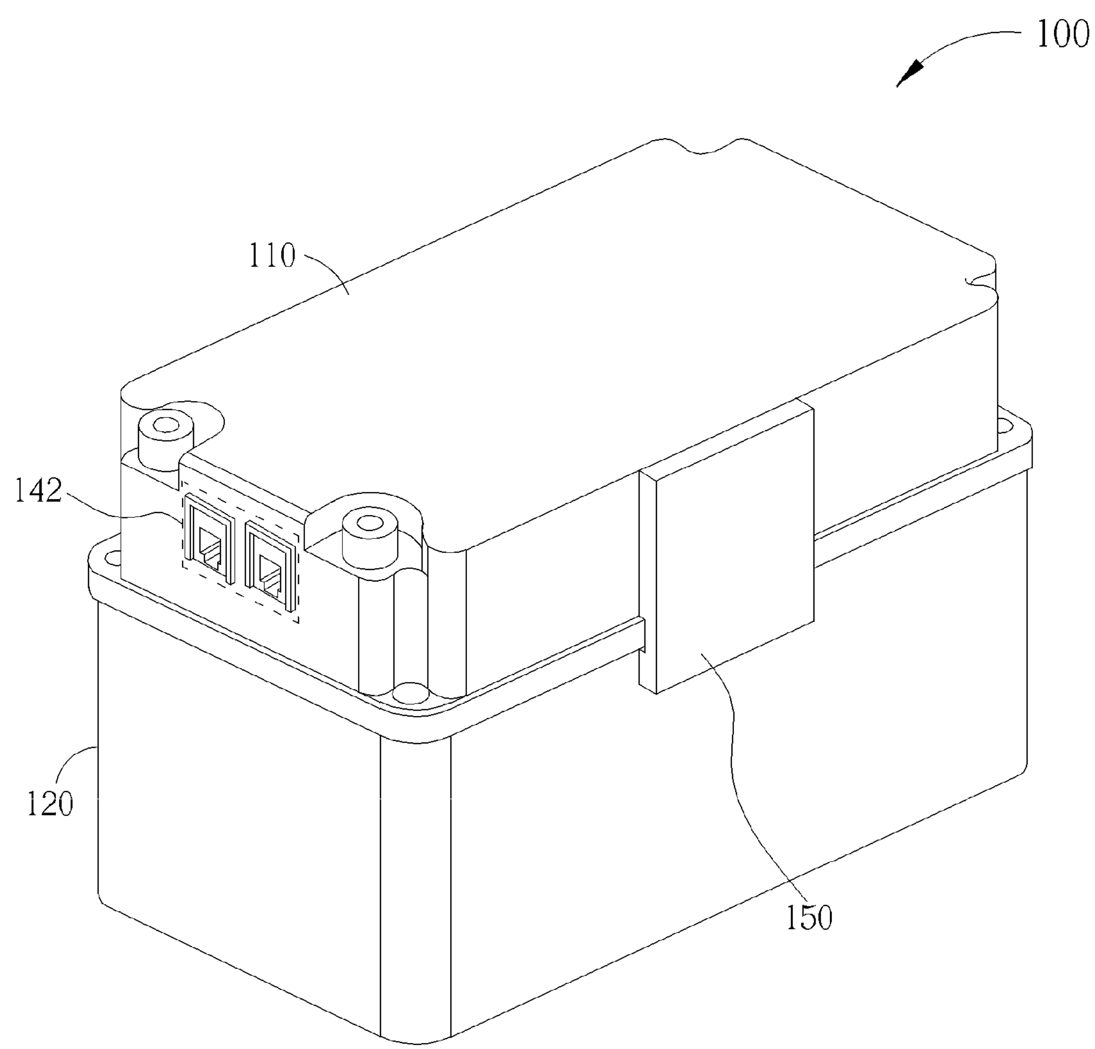
FIG. 8 is a diagram illustrating assembly of the elements shown in FIG. 4, FIG. 6 and FIG. 7.

To facilitate understanding of technical features of the present invention, please refer to FIG. 3-FIG. 8. FIG. 3 is a diagram illustrating the top case 110, an internal heat sink 112, a printed circuit board (PCB) 114 and a connector $CON_{RJ45}$ involved with the method 200 shown in FIG. 2 according to an embodiment of the present invention. FIG. 4 is a diagram illustrating assembly of the elements shown in FIG. 3. In this embodiment, the connector $CON_{RJ45}$ may be a RJ45 connector such as a connector for connecting network cables used in a personal computer. This is for illustrative purposes only, and is not meant to be a limitation of the present invention. According to variations of this embodiment, the connector $CON_{RJ45}$ may be replaced by other types of connectors. In addition, FIG. 5 is a diagram illustrating the bottom case 120 and a battery module 130 involved with the method 200 shown in FIG. 2 according to the embodiment shown in FIG. 3. FIG. 6 is a diagram illustrating assembly of the elements shown in FIG. 5. The battery module 130 may be an example of the specific battery module in step 210 shown in FIG. 2. A set of battery cells within the battery module 130 shown in FIG. 5 may include four battery cells connected in series, and the set of battery cells in this embodiment may be an example of the set of battery cells in step 210. FIG. 7 is a diagram illustrating a pluggable external module 150 involved with the method 200 shown in FIG. 2 according to the embodiment shown in FIG. 3. FIG. 8 is a diagram illustrating assembly of the elements shown in FIG. 4, FIG. 6 and FIG. 7. The pluggable external module 150 may include a connection port 152. Please note that the pluggable external module 150 may be an example of the pluggable external module in step 210 shown in FIG. 2, and the connection port 152 may be an example of the first connection port in step 210 shown in FIG. 2.

As shown in FIG. 4, at least one portion of the connector $CON_{RJ45}$ shown in FIG. 3 is exposed to at least one opening of the at least one case (e.g. the top case 110) so that the connection port 142 including a plurality of connectors $\{CON_{RJ45}\}$ may be disposed on the at least one case. Similarly, at least one portion of another connector 1141 shown in FIG. 3 is exposed to at least one opening of the at least one case (e.g. the top case 110) so that the second connection port (e.g. the connection port 140 including the connector 1141) corresponding to the first connection port may be disposed on the at least one case.

In this embodiment, the apparatus 100 may include a power supply module (e.g. the power supply module represented by the architecture shown in FIG. 1), wherein the power supply module may include the specific battery module (e.g. the battery module 130 shown in FIG. 5) and further include the at least one case (e.g. the top case 110 and the bottom case 120). Specifically, the apparatus 100 may include the pluggable external module in step 210 (e.g. the pluggable external module 150 shown in FIG. 7), wherein the power supply module may correspond to the pluggable external module 150. For example, the second connection port (e.g. the connection port 140) may include a plurality of terminals, and the terminals of the second connection port may be coupled to the set of battery cells (e.g. the set of battery cells within the battery module 130 shown in FIG. 5), respectively. Additionally, the first connection port (e.g. the connection port 152) may include a plurality of terminals, and the terminals of the first connection port may be coupled to the set of external balancing circuits, respectively. Hence, the second connection port corresponding to the first connection port (e.g. the connection port 140 corresponding to the connection port 152) may be disposed on the at least on case (e.g. the top case 110), allowing the pluggable external module 150 to be coupled to the battery module 130 with aid of the pluggable mechanism formed with the connection port 152 and the connection port 140 (especially allowing the set of external balancing circuits to be coupled to the set of battery cells within the battery module 130 with aid of the pluggable mechanism), in order to utilize the set of external balancing circuits to perform balancing operations upon the set of battery cells.

Figure 9:
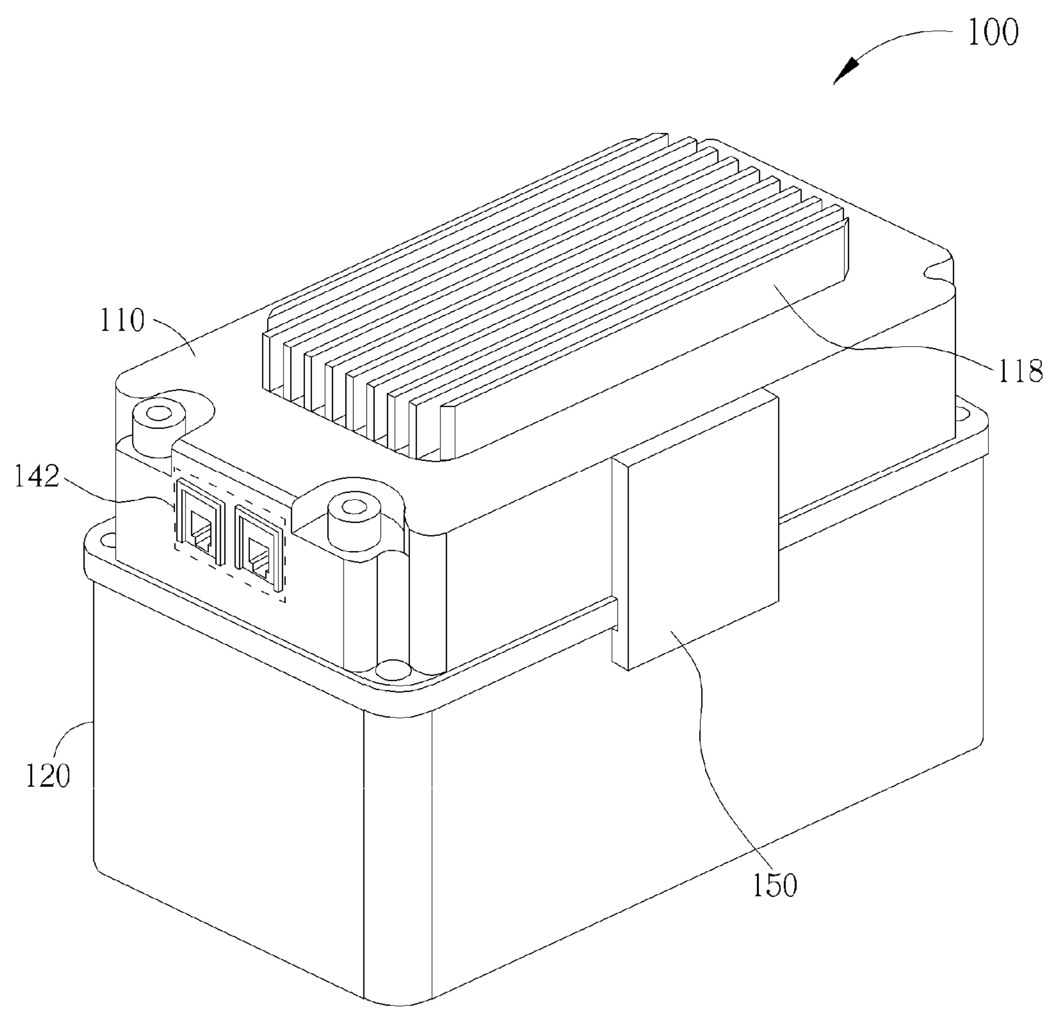
FIG. 9 is a diagram illustrating an external heat sink involved with the method shown in FIG. 2 according to another embodiment of the present invention.

As shown in FIG. 3, the apparatus 100 may include the internal heat sink 112. The method 200 may further include the following step: providing at least one internal heat sink (e.g. the internal heat sink 112) in the case of the specific battery module, allowing heat generated from at least one element (e.g. a set of internal balancing circuits which is arranged for perform the balancing operations upon the set of battery cells) in the case of the specific battery module to be dissipated through the at least one internal heat sink and the case of the specific battery module. In this embodiment, the set of internal balancing circuits may be disposed on the PCB 114. Based on the architecture shown in FIG. 3 and FIG. 4, the internal heat sink 112 may absorb heat from the at least one element (e.g. the set of internal balancing circuits), and the at least one case (e.g. the top case 110) may absorb heat from the internal heat sink 112 in order to dissipate the heat to the outside of the at least one case. This is for illustrative purposes only, and is not meant to be a limitation of the present invention. According to variations of the embodiment shown in FIG. 3, such as the embodiment shown in FIG. 9, the apparatus 100 may include an external heat sink 118. Hence, the method 200 may further include the following step: providing at least one external heat sink (e.g. the external heat sink 118) on the case of the specific battery module, allowing heat generated from at least one element (e.g. the set of internal balancing circuits) in the case of the specific battery module to be dissipated through the at least one internal heat sink, the case of the specific battery module and the at least one external heat sink. Based on the architecture shown in FIG. 3, FIG. 4 and FIG. 9, the internal heat sink 112 may absorb heat from the at least one element (e.g. the set of internal balancing circuits), the at least one case (e.g. the top case 110) may absorb heat from the internal heat sink 112, and the at least one external heat sink (e.g. the external heat sink 118) may absorb heat from the at least one case (e.g. the top case 110) in order to dissipate the heat to the outside of the at least one case.

As shown in FIG. 8, the number of power supply modules in the apparatus 100 may be greater than or equal to one, and the number of pluggable external modules in the apparatus 100 may be greater than or equal to one. This is for illustrative purposes only, and is not meant to be a limitation of the present invention. According to variations of the present invention, such as variations of the embodiment shown in FIG. 3, the number of power supply modules in the apparatus 100 may be greater than one. For example, the specific battery module (e.g. the battery module 130) may be a battery module of a set of battery modules connected in series within the power supply device, and each of the set of battery modules is identical to any other battery module of the set of battery modules. Specifically, the apparatus 100 may include a plurality of power supply modules (e.g. the aforementioned power supply modules), wherein the set of battery modules belongs to the power supply modules, respectively, and each of the power supply modules is identical to any other power supply module of the power supply modules. In another example, not only may the number of power supply modules in the apparatus 100 be greater than one, but the number of pluggable external modules in the apparatus 100 may be greater than one. Specifically, the apparatus 100 may include a plurality of pluggable external modules corresponding to the power supply modules, wherein each of the pluggable external modules is identical to any other pluggable external module of the pluggable external modules.

Figure 10:
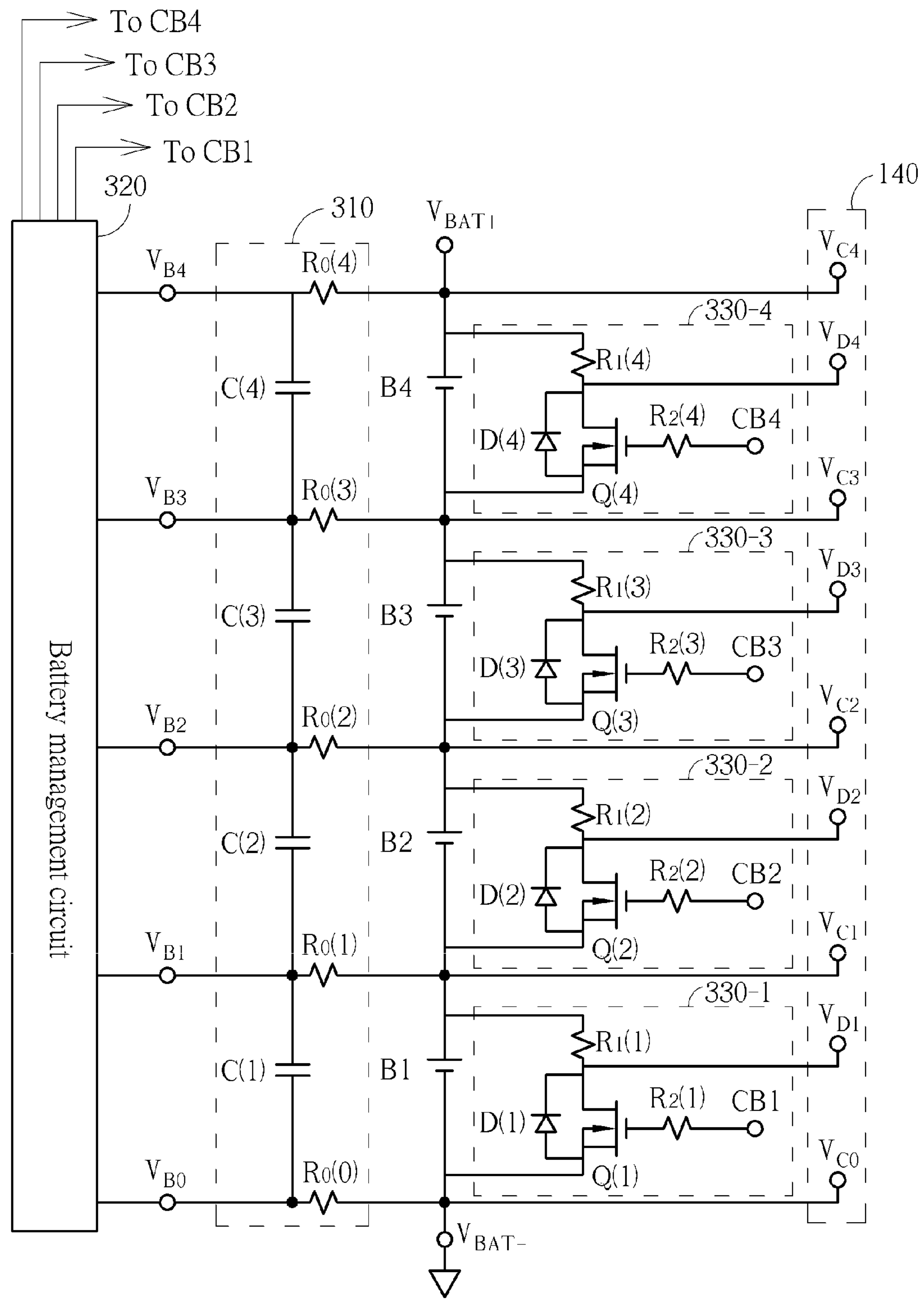
FIG. 10 is a diagram illustrating an internal electrical system involved with the method shown in FIG. 2 according to at least one preferred embodiment of the present invention.

FIG. 10 is a diagram illustrating an internal electrical system involved with the method 200 shown in FIG. 2 according to at least one preferred embodiment of the present invention. The connection port 140 may include a set of terminals $\{V_{C0}, V_{C1}, V_{C2}, V_{C3}, V_{C4}, V_{D1}, V_{D2}, V_{D3}, V_{D4}\}$, and at least one portion of the set of terminals $\{V_{C0}, V_{C1}, V_{C2}, V_{C3}, V_{C4}, V_{D1}, V_{D2}, V_{D3}, V_{D4}\}$ (e.g. the terminals $\{V_{C0}, V_{C1}, V_{C2}, V_{C3}, V_{C4}\}$) may be an example of the terminals of the connection port 140 involved with the embodiment shown in FIG. 3-FIG. 8.

As shown in FIG. 10, the internal electrical system may include a set of battery cells {B1, B2, B3, B4}, and the set of battery cells {B1, B2, B3, B4} may be an example of the set of battery cells involved with the embodiment shown in FIG. 3-FIG. 8, wherein terminals $\{V_{BAT-}, V_{BAT+}\}$ may be used as external terminals of the whole of the set of battery cells {B1, B2, B3, B4}. The terminal $V_{BAT-}$ may be selectively connected to ground if necessary. This is for illustrative purposes only, and is not meant to be a limitation of the present invention. In a case where the number of power supply modules in the apparatus 100 is greater than one, at most a terminal $V_{BAT-}$ of one set of battery cells within the set of power supple modules connected in series may be connected to ground, and other sets of battery cells within the set of power supple modules may be connected in series with a terminal $V_{BAT+}$ of the set of battery cells (the terminal $V_{BAT-}$ thereof may be connected to ground). Additionally, the terminals $\{V_{B0}, V_{B1}, V_{B2}, V_{B3}, V_{B4}\}$ may be used as external terminals of respective battery cells of the set of battery cells {B1, B2, B3, B4}. For example, the terminals $\{V_{B0}, V_{B1}\}$ may be used as external terminals of the battery cell B1. In another example, the terminals $\{V_{B1}, V_{B2}\}$ may be used as external terminals of the battery cell B2. In yet another example, the terminals $\{V_{B2}, V_{B3}\}$ may be used as external terminals of the battery cell B3. In still another example, the terminals $\{V_{B3}, V_{B4}\}$ may be used as external terminals of the battery cell B4.

In this embodiment, the internal electrical system may include a detection circuit 310 and a battery management circuit 320. The detection circuit 310 may detect the set of battery cells {B1, B2, B3, B4} to generate a detection result (e.g. voltage levels of respective terminals of the set of battery cells {B1, B2, B3, B4}), and the battery management circuit 320 may perform balancing operations upon the set of battery cells {B1, B2, B3, B4} according to the detection result. Specifically, the detection circuit 310 may include a set of capacitors {C(1), C(2), C(3), C(4)} corresponding to the set of battery cells {B1, B2, B3, B4}, and further include a set of resistors $\{R_0(\mathbf{0}), R_0(\mathbf{1}), R_0(\mathbf{2}), R_0(\mathbf{3}), R_0(\mathbf{4})\}$. As shown in FIG. 10, each of the resistors $\{R_0(\mathbf{0}), R_0(\mathbf{1}), R_0(\mathbf{2}), R_0(\mathbf{3}), R_0(\mathbf{4})\}$ is coupled between a respective terminal of the set of battery cells {B1, B2, B3, B4} and a respective terminal of the set of capacitors {C(1), C(2), C(3), C(4)}. Please note that, in this embodiment, the battery management circuit 320 may be implemented by at least one gating logic circuit (e.g. one or more than one gating logic circuits), wherein the at least one gating logic circuit (e.g. one or more than one gating logic circuits) may include a plurality of logic gates and a related control circuits. This is for illustrative purposes only, and is not meant to be a limitation of the present invention. According to variations of the present invention, such as variations of the embodiment shown in FIG. 10, the battery management circuit 320 may include a microprocessor and a periphery circuit thereof.

The internal electrical system may further include a set of internal balancing circuits {330-1, 330-2, 330-3, 330-4}, which corresponds to the set of battery cells {B1, B2, B3, B4}, respectively. The set of internal balancing circuits {330-1, 330-2, 330-3, 330-4} may be an example of the set of internal balancing circuits. For example, the internal balancing circuit 330-1 corresponding to the battery cell B1 may include a metal-oxide-semiconductor field-effect transistor (MOSFET) Q(1) and a plurality of resistors (e.g. resistors $\{R_1(\mathbf{1}), R_2(\mathbf{1})\}$), wherein a diode D(1) may be implemented as an anti-parallel diode in the MOSFET Q(1), and a terminal CB1 may be used to control a gate of the MOSFET Q(1) to selectively enable or disable the internal balancing circuit 330-1. In another example, the internal balancing circuit 330-2 corresponding to the battery cell B2 may include a metal-oxide-semiconductor field-effect transistor (MOSFET) Q(2) and a plurality of resistors (e.g. resistors $\{R_1(\mathbf{2}), R_2(\mathbf{2})\}$), wherein a diode D(2) may be implemented as an anti-parallel diode in the MOSFET Q(2), and a terminal CB2 may be used to control a gate of the MOSFET Q(2) to selectively enable or disable the internal balancing circuit 330-2. In yet another example, the internal balancing circuit 330-3 corresponding to the battery cell B3 may include a metal-oxide-semiconductor field-effect transistor (MOSFET) Q(3) and a plurality of resistors (e.g. resistors $\{R_1(\mathbf{3}), R_2(\mathbf{3})\}$), wherein a diode D(3) may be implemented as an anti-parallel diode in the MOSFET Q(3), and a terminal CB3 may be used to control a gate of the MOSFET Q(3) to selectively enable or disable the internal balancing circuit 330-3. In still another example, the internal balancing circuit 330-4 corresponding to the battery cell B4 may include a metal-oxide-semiconductor field-effect transistor (MOSFET) Q(4) and a plurality of resistors (e.g. resistors $\{R_1(\mathbf{4}), R_2(\mathbf{4})\}$), wherein a diode D(4) may be implemented as an anti-parallel diode in the MOSFET Q(4), and a terminal CB4 may be used to control a gate of the MOSFET Q(4) to selectively enable or disable the internal balancing circuit 330-4.

Based on the architecture shown in FIG. 10, the battery management circuit 320 may enable any one of the set of internal balancing circuits {330-1, 330-2, 330-3, 330-4} to consume energy of a corresponding battery cell within the set of battery cells {B1, B2, B3, B4}. For example, when the detection result indicates that a voltage across two terminals of a battery cell B_i of the set of battery cells {B1, B2, B3, B4} is greater than an average value of voltages across respective two terminals of the set of battery cells {B1, B2, B3, B4}, the battery management circuit 320 may enable an internal balancing circuit **330-*i* (corresponding to the battery cell B_i) of the set of internal balancing circuits {330-1, 330-2, 330-3, 330-4} in order to use a resistor $R_1(i)$ to consume energy of the battery cell B_i (and/or perform passive balancing operations), wherein the index i may be a positive integer in the interval [1, 4]. This is for illustrative purposes only, and is not meant to be a limitation of the present invention. According to variations of the present invention, such as variations of the embodiment shown in FIG. 10, the number of battery cells in the battery module 130 may be varied. As the number of corresponding internal balancing circuits may be equal to the number of battery cells in the battery module 130**, the range of the index i may be varied accordingly.

According to a variation of the embodiment shown in FIG. 10, when the detection result indicates that a voltage across two terminals of a battery cell B_i of the set of battery cells {B1, B2, B3, B4} is equal to an average value of voltages across respective two terminals of the set of battery cells {B1, B2, B3, B4}, and a difference value obtained by subtracting the average value from the voltage across the two terminals of the battery cell B_i reaches a predetermined threshold, the battery management circuit 320 may enable an internal balancing circuit 330-*i* (corresponding to the battery cell B_i) of the set of internal balancing circuits {330-1, 330-2, 330-3, 330-4} in order to use a resistor $R_1(i)$ to consume energy of the battery cell B_i (and/or perform passive balancing operations), wherein the index i may be a positive integer in the interval [1, 4]. This is for illustrative purposes only, and is not meant to be a limitation of the present invention. According to another variation of the embodiment shown in FIG. 10, the number of battery cells in the battery module 130 may be varied. As the number of corresponding internal balancing circuits may be equal to the number of battery cells in the battery module 130, the range of the index i may be varied accordingly.

In the embodiment shown in FIG. 10, respective resistance values of the resistors {$R_0(\mathbf{0})$, $R_0(\mathbf{1})$, $R_0(\mathbf{2})$, $R_0(\mathbf{3})$, $R_0(\mathbf{4})$} may equal 510 ohms, respective resistance values of the resistors {$R_1(\mathbf{1})$, $R_1(\mathbf{2})$, $R_1(\mathbf{3})$, $R_1(\mathbf{4})$} may equal 13.3 ohms, and respective resistance values of the resistors {$R_2(\mathbf{1})$, $R_2(\mathbf{2})$, $R_2(\mathbf{3})$, $R_2(\mathbf{4})$} may equal 1K ohms, wherein the symbol "K" denotes $10^3$. This is for illustrative purposes only, and is not meant to be a limitation of the present invention. According to variations of the embodiment shown in FIG. 10, resistance values of at least one portion of the resistors (in one example, the resistors {$R_0(\mathbf{0})$, $R_0(\mathbf{1})$, $R_0(\mathbf{2})$, $R_0(\mathbf{3})$, $R_0(\mathbf{4})$}, the resistors {$R_1(\mathbf{1})$, $R_1(\mathbf{2})$, $R_1(\mathbf{3})$, $R_1(\mathbf{4})$} or the resistors {$R_2(\mathbf{1})$, $R_2(\mathbf{2})$, $R_2(\mathbf{3})$, $R_2(\mathbf{4})$}; in another example, the resistors {$R_0(\mathbf{0})$, $R_0(\mathbf{1})$, $R_0(\mathbf{2})$, $R_0(\mathbf{3})$, $R_0(\mathbf{4})$, $R_1(\mathbf{1})$, $R_1(\mathbf{2})$, $R_1(\mathbf{3})$, $R_1(\mathbf{4})$, $R_2(\mathbf{1})$, $R_2(\mathbf{2})$, $R_2(\mathbf{3})$, $R_2(\mathbf{4})$}) may be varied.

In the embodiment shown in FIG. 3 - FIG. 8, the elements in the at least one case include the set of internal balancing circuits, and the apparatus 100 may include at least one determination circuit (not shown in FIG. 10), which may be used to selectively enable the set of internal balancing circuits according to whether the pluggable external module 150 is coupled to the specific battery module (e.g. the battery module 130). For example, the at least one determination circuit may be disposed in the at least one case (especially in the power supply module represented by the architecture shown in FIG. 1). Specifically, when detecting the pluggable external module 150 is coupled to the specific battery module (e.g. the battery module 130), the at least one determination circuit may disable the set of internal balancing circuits; otherwise, the at least one determination circuit may selectively enable the set of internal balancing circuits in order to utilize the set of the internal balancing circuits to perform balancing operations. In practice, the at least one determination circuit may be implemented by the battery management circuit 320, and the at least one determination circuit, for example, may be integrated into the at least one gating logic circuit. In another example, the at least one determination circuit may be disposed in the pluggable external module 150. Specifically, when detecting the pluggable external module 150 is coupled to the specific battery module (e.g. the battery module 130), the at least one determination circuit may disable the set of internal balancing circuits. Hence, the method shown in FIG. 2 may further include: disposing the aforementioned set of internal balancing circuits (i.e. the set of battery cells involved with the embodiment shown in FIG. 3-FIG. 8), such as the set of internal balancing circuits {330-1, 330-2, 330-3, 330-4} shown in FIG. 10, in the case of the specific battery module, wherein in a situation where the pluggable external module 150 is not coupled to the specific battery cell (e.g. the battery module 130) through the pluggable mechanism, the pluggable external module 150 uses the set of internal balancing circuits to perform the balancing operations upon the set of battery cells {B1, B2, B3, B4}. In one example, the set of internal balancing circuits may be passive balancing circuits (e.g. a balancing circuit capable of performing balancing operations without a power source), and the set of external balancing circuits may be active balancing circuits (e.g. a balancing circuit which may monitor batteries in order to determine whether to perform balancing operations, and/or a balancing circuit which needs a power source to monitor batteries or performing balancing operations). The set of internal balancing circuits {330-1, 330-2, 330-3, 330-4} shown in FIG. 10 may be an example of passive balancing circuits. This is for illustrative purposes only, and is not meant to be a limitation of the present invention. According to variations of this embodiment, the architecture of the set of internal balancing circuits may be varied. For example, the set of internal balancing circuits may include at least one active balancing circuit. In another example, the set of internal balancing circuits may include at least one active balancing circuit and at least one passive balancing circuit. According to other variations of this embodiment, whether the pluggable external module 150 is coupled to the specific battery cell (e.g. the battery module 130) through of the pluggable mechanism or not, the set of internal balancing circuits may perform the balancing operations upon the set of battery cells {B1, B2, B3, B4}.

According to other variations of this embodiment, the at least one determination circuit may selectively enable at least one portion of the set of external balancing circuits according to whether the pluggable external module 150 is coupled to the specific battery cell (e.g. the battery module 130). For example, the at least one determination circuit may be disposed in the at least one case (especially in the power supply module represented by the architecture shown in FIG. 1). In another example, the at least one determination circuit may be disposed in the pluggable external module 150. Hence, the method 200 shown in FIG. 2 may further include the following step: providing at least one determination circuit in the pluggable external module 150 or in the at least one case in order to determine whether to enable at least one portion of the set of external balancing circuits. In practice, when detecting that the pluggable external module 150 is coupled to the specific battery cell (e.g. the battery module 130), the at least one determination circuit may enable the at least one portion of the set of external balancing circuits.

Figure 11:
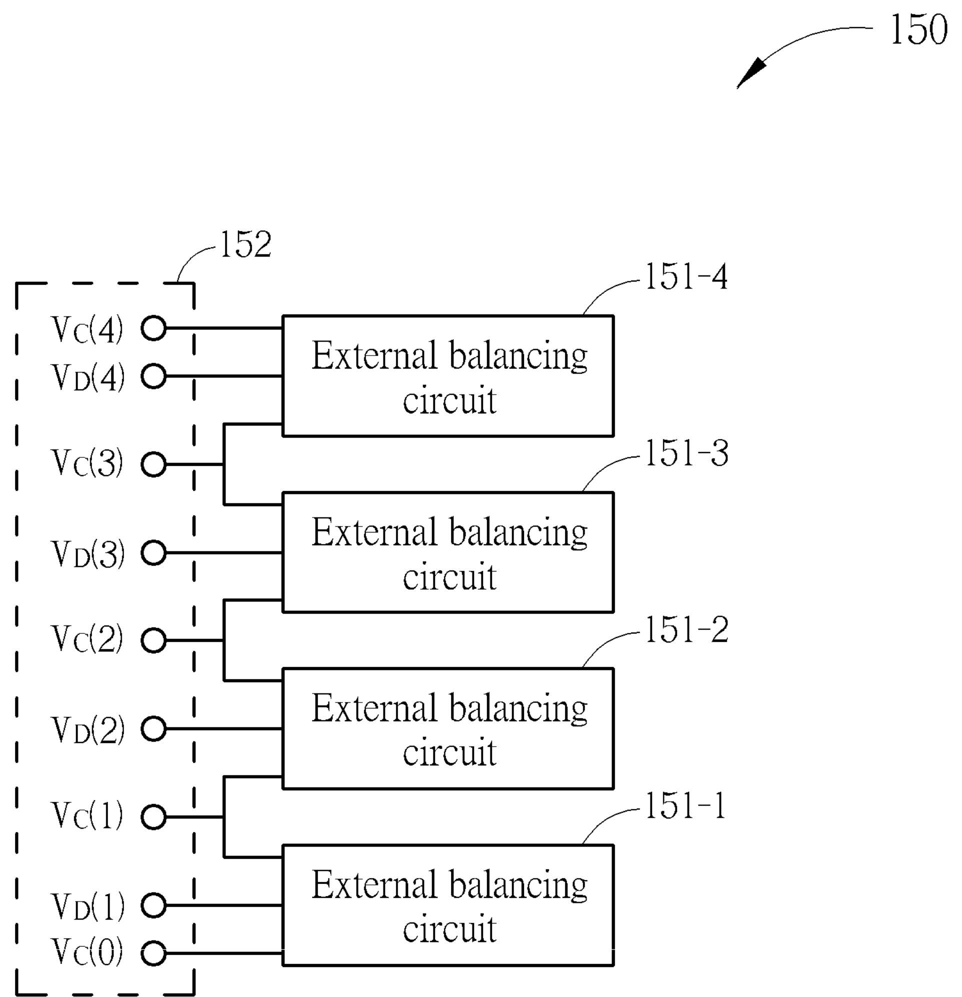
FIG. 11 is a diagram illustrating a set of external balancing circuits involved with the method shown in FIG. 2 according to the embodiment shown in FIG. 10.

FIG. 11 is a diagram illustrating a set of external balancing circuits {151-1, 151-2, 151-3, 151-4} involved with the method 200 shown in FIG. 2 according to the embodiment shown in FIG. 10. The connection port may include a set of terminals {$V_C(\mathbf{0})$, $V_C(\mathbf{1})$, $V_C(\mathbf{2})$, $V_C(\mathbf{3})$, $V_C(\mathbf{4})$, $V_D(\mathbf{1})$, $V_D(\mathbf{2})$, $V_D(\mathbf{3})$, $V_D(\mathbf{4})$}, and at least one portion of the set of terminals {$V_C(\mathbf{0})$, $V_C(\mathbf{1})$, $V_C(\mathbf{2})$, $V_C(\mathbf{3})$, $V_C(\mathbf{4})$, $V_D(\mathbf{1})$, $V_D(\mathbf{2})$, $V_D(\mathbf{3})$, $V_D(\mathbf{4})$} (e.g. the terminals {$V_C(\mathbf{0})$, $V_C(\mathbf{1})$, $V_C(\mathbf{2})$, $V_C(\mathbf{3})$, $V_C(\mathbf{4})$}) may be an example of the terminals of the connection port 152 involved with the embodiment shown in FIG. 3-FIG. 8. In addition, the set of external balancing circuits {151-1, 151-2, 151-3, 151-4} may be an example of the set of external balancing circuits in step 210.

As shown in FIG. 11, the set of terminals {$V_C(\mathbf{0})$, $V_C(\mathbf{1})$, $V_C(\mathbf{2})$, $V_C(\mathbf{3})$, $V_C(\mathbf{4})$, $V_D(\mathbf{1})$, $V_D(\mathbf{2})$, $V_D(\mathbf{3})$, $V_D(\mathbf{4})$} of the connection port 152 may correspond to the set of terminals {$V_{C0}$, $V_{C1}$, $V_{C2}$, $V_{C3}$, $V_{C4}$, $V_{D1}$, $V_{D2}$, $V_{D3}$, $V_{D4}$} of the connection port 140. In a case where the pluggable external module 150 is coupled to the specific battery module (e.g. the battery module 130) with aid of the pluggable mechanism, the set of terminals {$V_C$(0), $V_C$(1), $V_C$(2), $V_C$(3), $V_C$(4), $V_D$(1), $V_D$(2), $V_D$(3), $V_D$(4)} of the connection port 152 may be electrically connected to the set of terminals {$V_{C0}$, $V_{C1}$, $V_{C2}$, $V_{C3}$, $V_{C4}$, $V_{D1}$, $V_{D2}$, $V_{D3}$, $V_{D4}$} of the connection port 140.

Figure 12:
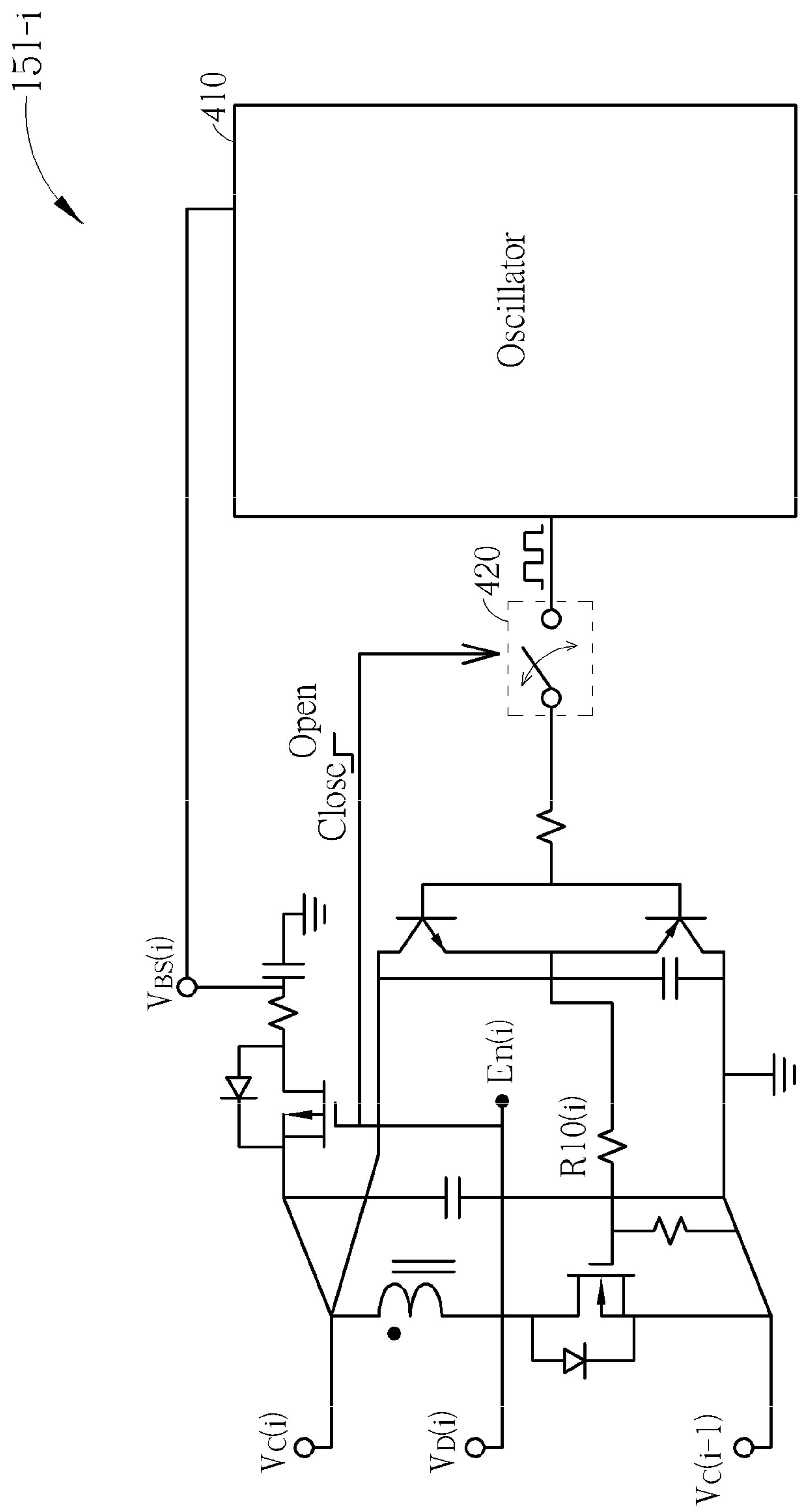
FIG. 12 a diagram illustrating implementation details of an external balancing circuit of the set of external balancing circuits shown in FIG. 11 according to an embodiment of the present invention.

FIG. 12 a diagram illustrating implementation details of an external balancing circuit 151-*i* of the set of external balancing circuits {151-1, 151-2, 151-3, 151-4} shown in FIG. 11 according to an embodiment of the present invention, wherein the index i may be a positive integer in the interval [1, 4]. This is for illustrative purposes only, and is not meant to be a limitation of the present invention. According to variations of the present invention, such as variations of the embodiment shown in FIG. 10, the number of battery cells in the battery module 130 may be varied. As the number of corresponding internal balancing circuits may be equal to the number of battery cells in the battery module 130, the range of the index i may be varied accordingly.

As shown in FIG. 12, the external balancing circuit 151-*i* may include an oscillator 410, a switch unit 420, a plurality of capacitors, a plurality of MOSFETs, at least one winding, a plurality of bipolar junction transistors (BJTs) and a plurality of resistors (e.g. a resistor R10(*i*)). The oscillator 410 is used to generate an oscillation signal, and the switch unit 420 may selectively conduct an output terminal of the oscillator 410 to a next stage according to whether a control signal at an terminal En(i) is at a low level, wherein the low level and a high level of the control signal may be used to switch the switch unit 420 to a closed state and an open state, respectively. For example, when the control signal is at the low level, the switch unit 420 is at the closed state (labeled "Close" in FIG. 12), thereby conducting the output terminal of the oscillator 410 to the next stage. In another example, when the control signal is at the high level, the switch unit 420 is at the open state (labeled "Open" in FIG. 12), thereby prevent the output terminal of the oscillator 410 from being conducted to the next stage. The terminal En(i) may be used as an enable terminal, and is electrically connected to the terminal $V_D$(i) of the set of terminals {$V_C$(0), $V_C$(1), $V_C$(2), $V_C$(3), $V_C$(4), $V_D$(1), $V_D$(2), $V_D$(3), $V_D$(4)} of the connection port 152. Hence, in a case where the pluggable external module 150 is coupled to the specific battery module (e.g. the battery module 130) with aid of the pluggable mechanism, the terminal En(i) may be electrically connected to the corresponding terminal $V_{Di}$ of the set of terminals {$V_{C0}$, $V_{C1}$, $V_{C2}$, $V_{C3}$, $V_{C4}$, $V_{D1}$, $V_{D2}$, $V_{D3}$, $V_{D4}$} of the connection port 140 through the terminal $V_D$(i). To facilitate understanding of technical features of the present invention, signal waveforms are labeled on certain signal paths within the external balancing circuit 151-*i*. This is for illustrative purposes only, and is not meant to be a limitation of the present invention. A voltage level $V_{BS}$(i) of a positive terminal of the capacitor shown in the top left of FIG. 12 may be used as a power source of the oscillator 410, and the MOSFET on a path between the capacitor and the terminal $V_C$(i) may be regarded as a switch of the power source of the oscillator 410. In a case where the MOSFET is turned on by the control signal at the terminal En(i), electric power required by the voltage level $V_{BS}$(i) may be obtained from the battery cell B_i (corresponding to the external balancing circuit 151-*i*) of the set of battery cells {B1, B2, B3, B4} through the connection port 140 and the connection port 152. Please note that another ground symbol (different from the ground symbol shown in the bottom of FIG. 10) is illustrated in the external balancing circuit 151-*i*, wherein the another ground symbol denotes a local ground of the external balancing circuit 151-*i* instead of a global ground of the apparatus 100. In order to avoid affecting the normal operation of the apparatus 100, respective local grounds of the set of external balancing circuits {151-1, 151-2, 151-3, 151-4} cannot be coupled to each other.

Other parts in the architecture shown in FIG. 12 may be used for balancing operations, especially active balancing operations. For example, the external balancing circuit 151-*i* may use the winding shown in the top left of FIG. 12 to transmit energy of the corresponding battery cell B_i to at least one portion (e.g. one or more than one) of other battery cells of the set of battery cells {B1, B2, B3, B4}. In another example, the external balancing circuit 151-*i* may use the winding shown in the top left of FIG. 12 to input energy of at least one portion (e.g. one or more than one) of other battery cells of the set of battery cells {B1, B2, B3, B4} to the corresponding battery cell B_i.

Please note that the voltage level $V_{BS}$(i) of the positive terminal of the capacitor shown in the top left of FIG. 12 may be used as the power source of the oscillator 410, and the MOSFET on the path between the capacitor and the terminal $V_C$(i) may be regarded as the switch of the power source of the oscillator 410. This is for illustrative purposes only, and is not meant to be a limitation of the present invention. According to a variation of this embodiment, the switch may be omitted, and respective lines of left side and right side of the switch may be connected (i.e. the left side and the right side of the switch are conducted to each other). Specifically, the MOSFET and the diode above the MOSFET may be omitted, wherein the electric power required by the voltage level $V_{BS}$(i) may be obtained at any time from the battery cell B_i (corresponding to the external balancing circuit 151-*i*) of the set of battery cells {B1, B2, B3, B4} through the connection port 140 and the connection port 152.

Figure 13:
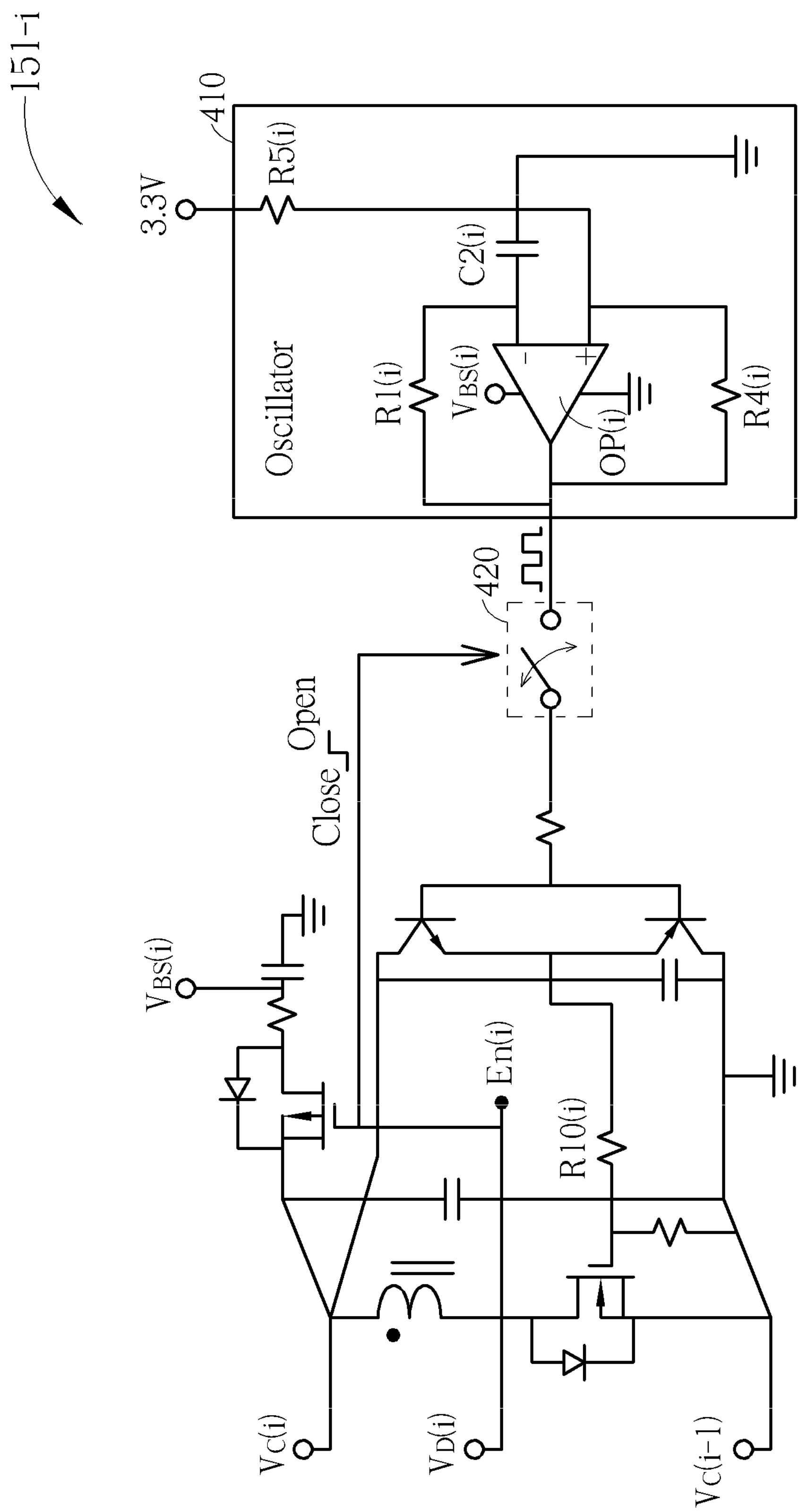
FIG. 13 a diagram illustrating implementation details of the oscillator shown in FIG. 12 according to an embodiment of the present invention.

FIG. 13 a diagram illustrating implementation details of the oscillator 410 shown in FIG. 12 according to an embodiment of the present invention. In this embodiment, the oscillator 410 may include at least one capacitor (e.g. a capacitor C2(*i*)), at least one operational amplifier OP(i) and a plurality of resistors (e.g. resistors {R1(*i*), R4(*i*), R5(*i*)}). The voltage level $V_{BS}$(i) of the positive terminal of the capacitor shown in the top left of FIG. 12 may be used as the power source of the operational amplifier OP(i), and the resistor R5(*i*) is coupled to a predetermined voltage level such as 3.3V, wherein the symbol "V" denotes volt. This is for illustrative purposes only, and is not meant to be a limitation of the present invention. According to variations of this embodiment, the architecture of the oscillator 410 may be varied.

Please note that the voltage level $V_{BS}$(i) of the positive terminal of the capacitor shown in the top left of FIG. 13 may be used as the power source of the operational amplifier OP(i), and the MOSFET on the path between the capacitor and the terminal $V_C$(i) may be regarded as the switch of the power source of the operational amplifier OP(i). This is for illustrative purposes only, and is not meant to be a limitation of the present invention. According to a variation of this embodiment, the switch may be omitted, and respective lines of left side and right side of the switch may be connected (i.e. the left side and the right side of the switch are conducted to each other). Specifically, the MOSFET and the diode above the MOSFET may be omitted, wherein the electric power required by the voltage level $V_{BS}$(i) may be obtained at any time from the battery cell B_i (corresponding to the external balancing circuit 151-*i*) of the set of battery cells {B1, B2, B3, B4} through the connection port 140 and the connection port 152.

Figure 14:
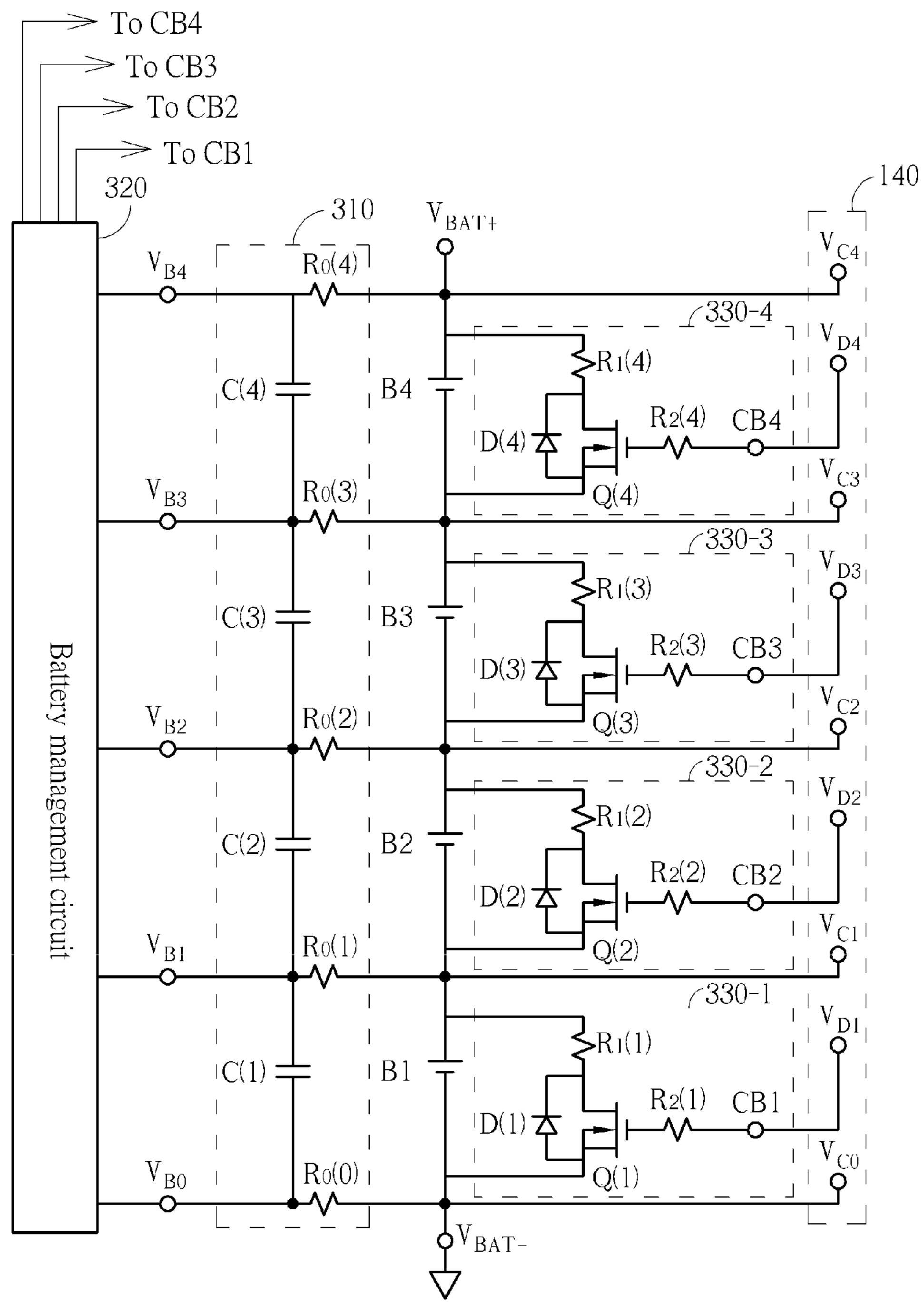
FIG. 14 is a diagram illustrating an internal electrical system involved with the method shown in FIG. 2 according to another embodiment of the present invention.

FIG. 14 is a diagram illustrating an internal electrical system involved with the method 200 shown in FIG. 2 according to another embodiment of the present invention. In contrast to the architecture shown in FIG. 10, instead of being directly connected to the terminals of the resistors $\{R_1(\mathbf{1}), R_1(\mathbf{2}), R_1(\mathbf{3}), R_1(\mathbf{4})\}$, the terminals $\{V_{D1}, V_{D2}, V_{D3}, V_{D4}\}$ are electrically connected to the terminals {CB1, CB2, CB3, CB4} in this embodiment. For the sake of brevity, similar descriptions are not repeated here.

Figure 15:
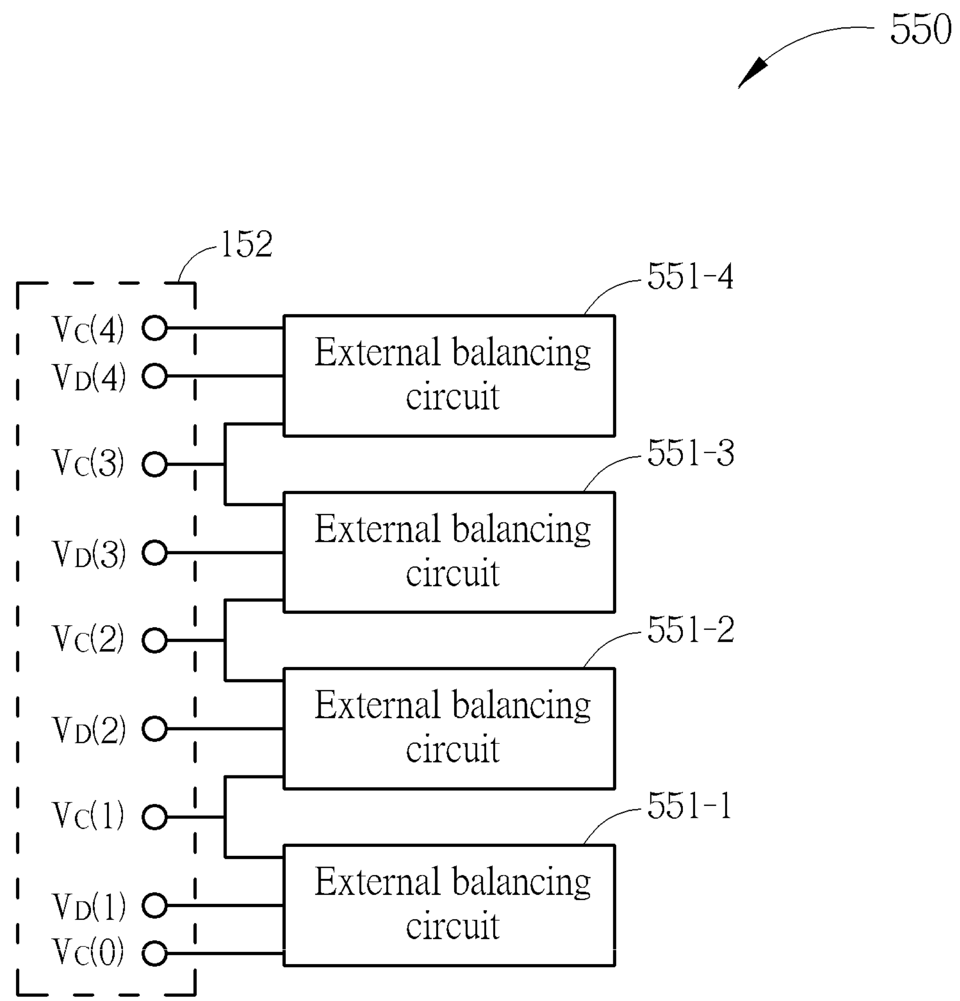
FIG. 15 is a diagram illustrating a set of external balancing circuits involved with the method shown in FIG. 2 according to the embodiment shown in FIG. 14.

FIG. 15 is a diagram illustrating a set of external balancing circuits {551-1, 551-2, 551-3, 551-4} involved with the method 200 shown in FIG. 2 according to the embodiment shown in FIG. 14. The connection port 152 in this embodiment may be identical to the connection port 152 in the embodiment shown in FIG. 11. In response to variations of the architecture shown in FIG. 14, the set of external balancing circuits are varied accordingly so that the pluggable external module is labeled 550. The set of external balancing circuits {551-1, 551-2, 551-3, 551-4} in this embodiment may be an example of the set of external balancing circuits in step 210. For the sake of brevity, similar descriptions are not repeated here.

Figure 16:
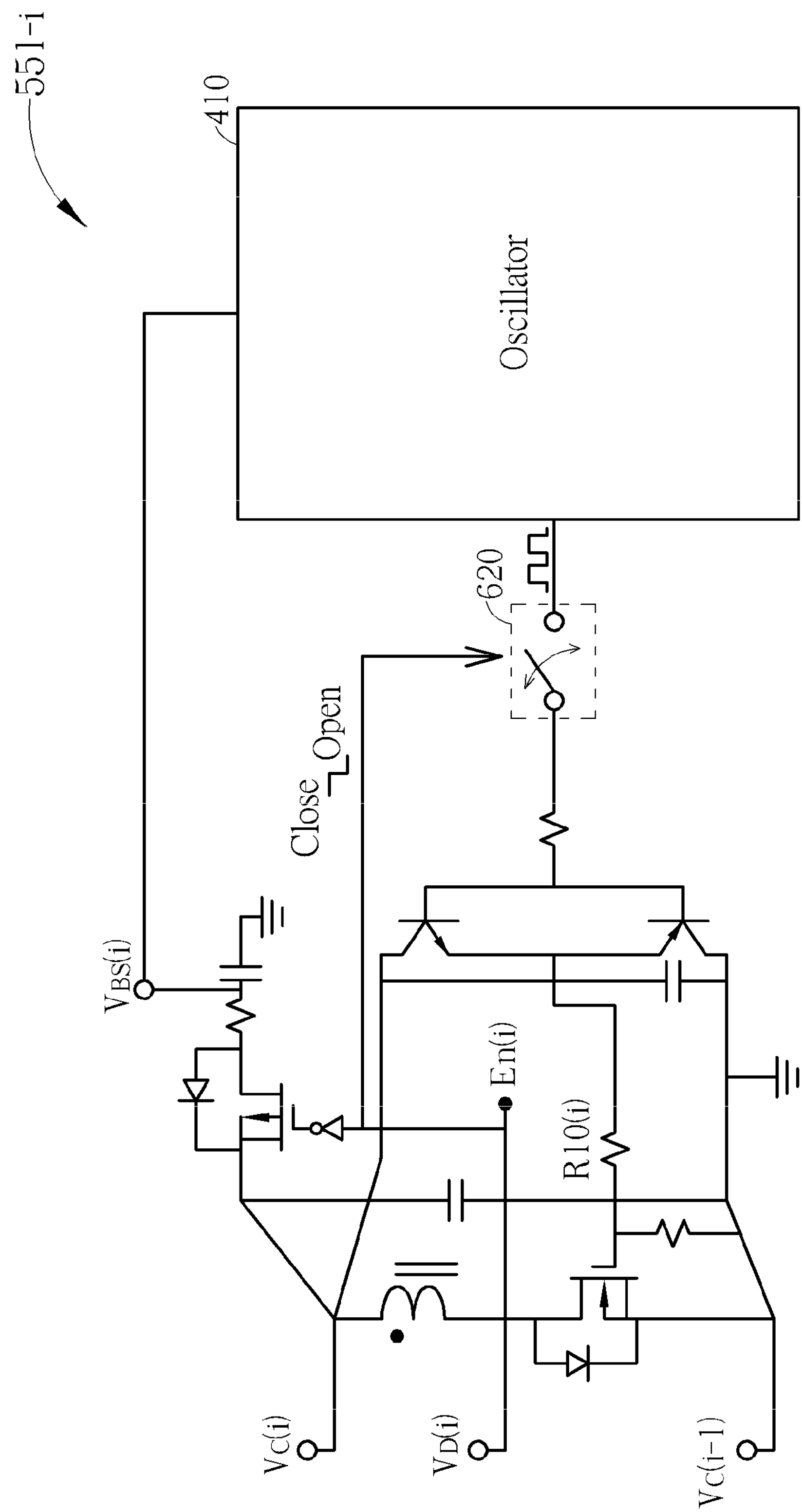
FIG. 16 a diagram illustrating implementation details of an external balancing circuit of the set of external balancing circuits shown in FIG. 15 according to an embodiment of the present invention.

FIG. 16 a diagram illustrating implementation details of an external balancing circuit 551-*i* of the set of external balancing circuits {551-1, 551-2, 551-3, 551-4} shown in FIG. 15 according to an embodiment of the present invention. In this embodiment, the switch unit 420 is replaced by the switch unit 620 in response to the variation of the control signal. Specifically, the switch unit 620 may selectively conduct an output terminal of the oscillator 410 to a next stage according to whether a control signal at an terminal En(i) is at a high level, wherein the high level and a low level of the control signal may be used to switch the switch unit 620 to a closed state and an open state, respectively. For example, when the control signal is at the high level, the switch unit 620 is at the closed state (labeled "Close" in FIG. 16), thereby conducting the output terminal of the oscillator 410 to the next stage. In another example, when the control signal is at the low level, the switch unit is at the open state (labeled "Open" in FIG. 16), thereby prevent the output terminal of the oscillator 410 from being conducted to the next stage. In addition, an inverter is disposed between the MOSFET shown in the top left of FIG. 16 and the terminal En(i). In a case where the MOSFET is turned on by an inverting signal of the control signal at the terminal En(i), electric power required by the voltage level VBS(i) may be obtained from the battery cell B_i (corresponding to the external balancing circuit 551-*i*) of the set of battery cells {B1, B2, B3, B4} through the connection port 140 and the connection port 152. For the sake of brevity, similar descriptions are not repeated here.

Please note that the voltage level $V_{BS}(i)$ of the positive terminal of the capacitor shown in the top left of FIG. 16 may be used as the power source of the oscillator 410, and the MOSFET on the path between the capacitor and the terminal $V_C(i)$ may be regarded as the switch of the power source of the oscillator 410. This is for illustrative purposes only, and is not meant to be a limitation of the present invention. According to a variation of this embodiment, the switch may be omitted, and respective lines of left side and right side of the switch may be connected (i.e. the left side and the right side of the switch are conducted to each other). Specifically, the MOSFET, the diode above the MOSFET and the inverter may be omitted, wherein the electric power required by the voltage level $V_{BS}(i)$ may be obtained at any time from the battery cell B_i (corresponding to the external balancing circuit 551-*i*) of the set of battery cells {B1, B2, B3, B4} through the connection port 140 and the connection port 152.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing battery balancing control with aid of pluggable mechanism, the method being applied to a power supply device, the method comprising:

providing a pluggable external module, wherein the pluggable external module comprises a set of external balancing circuits and a first connection port, and the set of external balancing circuits corresponds to a set of battery cells of a specific battery module within the power supply device, respectively;

providing a second connection port corresponding to the first connection port on a case of the specific battery module, allowing the pluggable external module to be detachably coupled to the specific battery module with aid of the pluggable mechanism formed with the first connection port and the second connection port, in order to utilize the set of external balancing circuits to perform balancing operations upon the set of battery cells; and disposing a set of internal balancing circuits in the case of the specific battery module, wherein in a situation where the pluggable external module is not coupled to the specific battery cell through the pluggable mechanism, the pluggable external module uses the set of internal balancing circuits to perform the balancing operations upon the set of battery cells;

wherein the set of internal balancing circuits corresponds to the set of battery cells, respectively.

2. The method of claim 1, wherein the step of providing the second connection port corresponding to the first connection port on the case of the specific battery module comprises:

providing the second connection port corresponding to the first connection port on the case of the specific battery module, allowing the set of external balancing circuits to be coupled to the set of battery cells with aid of the pluggable mechanism, in order to utilize the set of external balancing circuits to perform balancing operations upon the set of battery cells.

3. The method of claim 1, further comprising:

providing at least one internal heat sink in the case of the specific battery module, allowing heat generated from at least one element in the case of the specific battery module to be dissipated through the at least one internal heat sink and the case of the specific battery module.

4. The method of claim 3, further comprising:

providing at least one external heat sink on the case of the specific battery module, allowing heat generated from at least one element in the case of the specific battery module to be dissipated through the at least one internal heat sink, the case of the specific battery module and the at least one external heat sink.

5. The method of claim 1, further comprising:

selectively disabling the set of the internal balancing circuits according to whether the pluggable external module is coupled to the specific battery module.

6. The method of claim 1, further comprising:

providing at least one determination circuit in the pluggable external module or in the case of the specific battery module in order to determine whether to enable at least one portion of the set of external balancing circuits.

7. An apparatus for performing battery balancing control with aid of pluggable mechanism, the apparatus comprising at least one portion of a power supply device, the apparatus comprising:

a pluggable external module, comprising:

a set of external balancing circuits, for performing the balance operations, wherein the set of external balancing circuits corresponds to a set of battery cells of a specific battery module within the power supply device, respectively, wherein a set of internal balancing circuits is disposed in the case of the specific battery module; in a situation where the pluggable external module is not coupled to the specific battery cell through the pluggable mechanism, the pluggable external module uses the set of internal balancing circuits to perform the balancing operations upon the set of battery cells; and a first connection port, wherein the first connection port comprises a plurality of connection ports, and the connection ports are coupled to the set of external balancing circuits, respectively;

wherein a second connection port corresponding to the first connection port is disposed on a case of the specific battery module, allowing the pluggable external module to be detachably coupled to the specific battery module with aid of the pluggable mechanism formed with the first connection port and the second connection port, in order to utilize the set of external balancing circuits to perform balancing operations upon the set of battery cells.

8. The apparatus of claim 7, wherein the second connection port corresponding to the first connection port is disposed on the case of the specific battery module, allowing the set of external balancing circuits to be coupled to the set of battery cells with aid of the pluggable mechanism, in order to utilize the set of external balancing circuits to perform balancing operations upon the set of battery cells.

9. The apparatus of claim 7, wherein at least one determination circuit is disposed in the pluggable external module or in the case of the specific battery module in order to determine whether to enable at least one portion of the set of external balancing circuits.

10. The apparatus of claim 9, wherein the at least one determination circuit is further arranged for selectively disabling the set of internal balancing circuits according to whether the pluggable external module is coupled to the specific battery module.

11. The apparatus of claim 7, further comprising:

a power supply module, comprising:

the specific battery module;

the case of the specific battery module; and a set of internal balancing circuits, disposed in the case of the case of the specific battery module, the set of internal balancing circuits arranged for performing the balancing operations upon the set of battery cells.

12. An apparatus for performing battery balancing control with aid of pluggable mechanism, the apparatus comprising at least one portion of a power supply device, the apparatus comprising:

a power supply module, wherein the power supply module corresponds to a pluggable external module of the power supply device, the pluggable external module comprises a set of external balancing circuits and a first connection port, and the power supply module comprises:

a specific battery module, comprising a set of battery cells, wherein the set of external balancing circuits corresponds to the set of battery cells, respectively;

a case, wherein a second connection port corresponding to the first connection port is disposed on the case, allowing the pluggable external module to be detachably coupled to the specific battery module with aid of the pluggable mechanism formed with the first connection port and the second connection port, in order to utilize the set of external balancing circuits to perform balancing operations upon the set of battery cells; the second connection port comprises a plurality of connection ports; and the connection ports are coupled to the set of external balancing circuits, respectively; and a set of internal balancing circuits disposed in the case of the specific battery module, coupled to the set of battery cells, wherein in a situation where the pluggable external module is not coupled to the specific battery cell through the pluggable mechanism, the set of internal balancing circuits is arranged for performing the balancing operations upon the set of battery cells; and the set of internal balancing circuits corresponds to the set of battery cells, respectively.

13. The apparatus of claim 12, wherein the second connection port corresponding to the first connection port is disposed on the case of the specific battery module, allowing the set of external balancing circuits to be coupled to the set of battery cells with aid of the pluggable mechanism, in order to utilize the set of external balancing circuits to perform balancing operations upon the set of battery cells.

14. The apparatus of claim 12, wherein the power supply module further comprises:

at least one internal heat sink, disposed in the case of the specific battery module, allowing heat generated from at least one element in the case of the specific battery module to be dissipated through the at least one internal heat sink and the case of the specific battery module.

15. The apparatus of claim 14, wherein the power supply module further comprises:

at least one external heat sink, disposed on the case of the specific battery module, allowing heat generated from at least one element in the case of the specific battery module to be dissipated through the at least one internal heat sink, the case of the specific battery module and the at least one external heat sink.

16. The apparatus of claim 12, wherein at least one determination circuit is disposed in the pluggable external module or in the case of the specific battery module; the at least one determination circuit is arranged for determining whether to enable at least one portion of the set of external balancing circuits; and the at least one determination circuit is further arranged for selectively disabling the set of internal balancing circuits according to whether the pluggable external module is coupled to the specific battery module.

17. The apparatus of claim 12, further comprising:

the pluggable external module.

18. The apparatus of claim 12, wherein the specific battery module is a battery module of a set of battery modules connected in series within the power supply device; each of the set of battery modules is identical to any other battery module of the set of battery modules; and the apparatus comprises:

a plurality of power supply modules, wherein the set of battery modules belongs to the power supply modules, respectively; and each of the power supply modules is identical to any other power supply module of the power supply modules.

* * * * *